United States Patent [19]
Eyberg et al.

[11] Patent Number: 6,144,471
[45] Date of Patent: Nov. 7, 2000

[54] OPTICAL TRANSMISSION SYSTEM

[75] Inventors: Rudolf Eyberg, Gerlingen; Volker Hägele, Rudersberg, both of Germany

[73] Assignee: Alcatel, Paris, France

[21] Appl. No.: 09/072,281

[22] Filed: May 4, 1998

[30] Foreign Application Priority Data

May 12, 1997 [DE] Germany ............................ 197 19 425

[51] Int. Cl.[7] .................................................. H04J 14/02
[52] U.S. Cl. ............................ 359/125; 359/118; 359/127
[58] Field of Search ...................................... 359/125, 127, 359/118

[56] References Cited

U.S. PATENT DOCUMENTS

| 5,701,186 | 12/1997 | Huber | 359/125 |
| 5,793,506 | 8/1998 | Schmid | 359/125 |
| 5,933,437 | 8/1999 | Delavaux | 372/6 |

FOREIGN PATENT DOCUMENTS

9505041  2/1995  WIPO .

*Primary Examiner*—Leslie Pascal
*Assistant Examiner*—Hanh Phan

[57] ABSTRACT

A system (SYS) for optically transmitting information, e.g., television signals, from a subcenter (HUB), e.g., a cable television head end, over a passive optical distribution network to a plurality of optical network units (ONU) includes a plurality of nodes (K1, . . . , Km) for optically transmitting further information, e.g., telephone signals, and a plurality of optical couplers (C1, C2). The further information of each node (K1, . . . , Km) is fed via a respective coupler (C1, C2) into a transmission line connected to only part of the plurality of optical network units (ONU), e.g., to only one optical network unit (ONU). Each optical network unit (ONU) is connected to a group of customer locations (END) and, for the transmission of information from this group of customer locations (END), via a further passive optical distribution network to a node (K1, . . . , Km). Each node (K1, . . . , Km,) includes means for separating the information received from the customer locations into, e.g., interactive request signals and telephone signals. The interactive request signals are routed to the subcenter (HUB), and the telephone signals to a telephone network (NET).

20 Claims, 6 Drawing Sheets

OPTICAL TRANSMISSION SYSTEM

BACKGROUND OF THE INVENTION

1. Technical Field

This invention relates to an optical transmission system for optically transmitting information from a subcenter over a plurality of optical transmission lines to a plurality of optical network units.

2. Discussion of Related Art

WO 95/05041 discloses a system for optically transmitting information from a subcenter to a plurality of optical network units via a plurality of optical transmission lines. The subcenter is connected to the optical network units by a passive optical distribution network consisting of optical transmission lines and an optical splitter. At the subcenter, a plurality of electric subcarrier signals are combined into a frequency-division multiplex signal and subsequently converted from electrical to optical form. The subcarrier signals are television signals, for example, which are destined for all optical network units, and telephone signals, each of which is destined for only one of the optical network units. For the telephone signals, unlike the television signals, only a small frequency range is reserved. If a multitude of customer locations are connected via the optical network units to the subcenter, this relatively small frequency range does not suffice to make available a sufficient number of channels for the multitude of customer locations.

SUMMARY OF THE INVENTION

It is therefore an object of the invention to provide an optical transmission system which can transmit different information to a plurality of optical network units more flexibly.

According to a first aspect of the invention, a system for optically transmitting information from a subcenter over a plurality of optical transmission lines to a plurality of optical network units, the system comprising at least one means for optically transmitting further information and at least one optical coupler, the further information of each of the means being fed via a respective one of the optical couplers into an optical transmission line connected to only part of the plurality of optical network units, is characterized in that an optical signal distribution unit is provided for combining the information and the further information and then transmitting it together to the respective part of the plurality of optical network units, that the optical signal distribution unit comprises at least three optical couplers, at least two of which have two input ports and two output ports, that the information is applied to one of the at least three optical couplers which is connected to two of the at least two optical couplers with two input ports, and that the further information is applied to at least one of the at least two optical couplers with two input ports in order to combine it with the information from the subcenter.

According to a second aspect of the invention, an optical signal distribution unit of an optical transmission system for transmitting at least three different types of information, comprises at least three optical couplers, at least two of which have two input ports and two output ports, wherein a first type of information is applied to one of the at least three optical couplers which is connected to two of the at least two optical couplers with two input ports, wherein a second type of information is applied to at least one of the at least two optical couplers with two input ports to combine it with the first type of information, and wherein a third type of information is applied to at least one of the at least two optical couplers with two input ports to combine it with the first type of information.

The combination of the information, for example television signals, and the further information, for example telephone signals, via the optical couplers and the division of the further information among those transmission lines which are connected to the respective optical network unit for which the respective further information is exclusively intended optimize the utilization of the available transmission capacity. Furthermore, the expansion capability of the system is improved, since for each further optical network unit, for example, only one additional optical transmission line and one optical splitter are needed.

These and other objects, features and advantages of the present invention will become more apparent in light of the detailed description of a best mode embodiment thereof, as illustrated in the accompanying drawing.

BRIEF DESCRIPTION OF THE DRAWINGS

The invention will become more apparent from the following description of three embodiments when taken in conjunction with the accompanying drawings, in which.

DETAILED DESCRIPTION OF PREFERRED EMBODIMENTS

Figure 1:
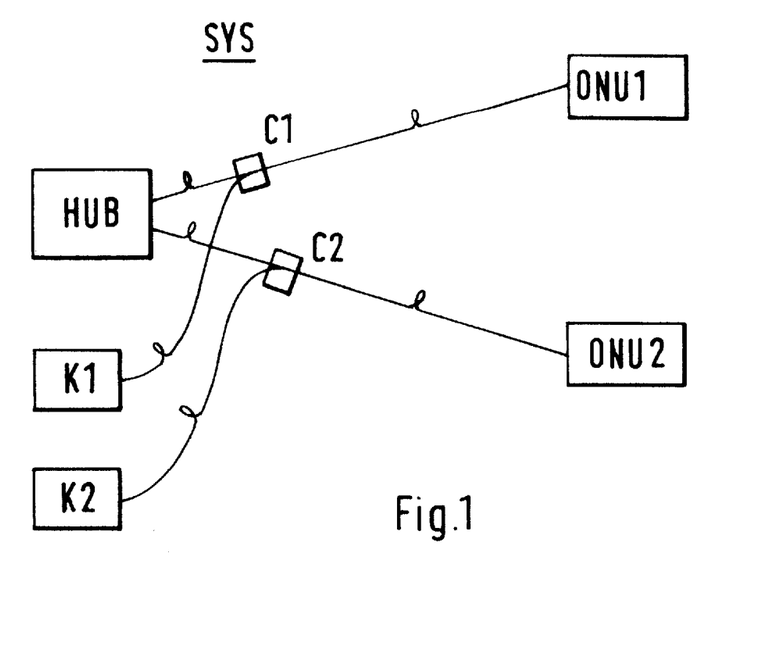
FIG. 1 is a schematic representation of a first optical transmission system according to the invention.

Referring to FIG. 1, which shows a first embodiment of an optical transmission system SYS in accordance with the invention, the system SYS includes a subcenter HUB which is connected by a first optical transmission line to an optical network unit ONU1 and by a second optical transmission line to an optical network unit ONU2. From the subcenter, first information is transmitted to the optical network unit ONU1, and second information to the optical network unit ONU2. The first and second information may be identical, for example in the case of a distribution service, such as the distribution of television signals, or different, for example in the case of a data transmission.

The system SYS further includes two nodes K1, K2 for optically transmitting further information. The further information of the node K1, for example telephone signals or data signals, is destined exclusively for the optical network unit ONU1 and not for the optical network unit ONU2. Therefore, the further information of the node K1 is transmitted to the optical network unit ONU1 via a further transmission line and an optical coupler C1 inserted in the first transmission line, and then, together with the information from the subcenter HUB, via a part of the first transmission line.

The further information of the node K2, for example telephone signals or data signals, is destined exclusively for the optical network unit ONU2 and not for the optical network unit ONU1. Therefore, the further information of the node K2 is transmitted to the optical network unit ONU2 via a further transmission line and an optical coupler C2 inserted in the second transmission line and then, together with the information from the subcenter HUB, via a part of the second transmission line.

Thus, the further information from the nodes K1 and K2 is optically combined with the information from the subcenter HUB and fed to the optical network units ONU1 and ONU2, respectively, each of which is connected to a group of customer locations, for example. In this manner, groups of customer locations can be supplied at low cost both with broadcast information and with specific information destined exclusively for the respective group of customer locations, with optimum use being made of the existing transmission capacity.

Figure 2:
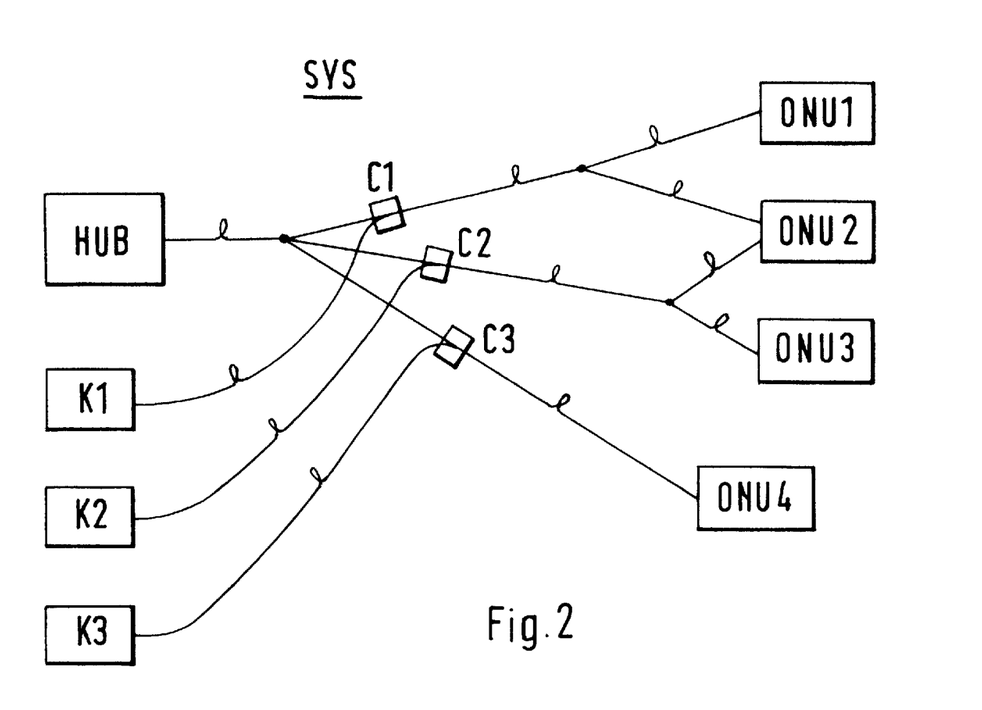
FIG. 2 is a schematic representation of a second optical transmission system according to the invention.

Referring to FIG. 2, which shows a second embodiment of an optical transmission system SYS in accordance with the invention, the system SYS includes a subcenter HUB which is connected to four optical network units ONU1, ONU2, ONU3, ONU4 by a passive optical network consisting of optical transmission lines and three optical splitters. The optical network unit ONU2 is connected to the subcenter HUB by two different paths. Through this redundancy, the optical network unit ONU2 receives the information from the subcenter HUB doubly and can select therefrom. The introduction of two different paths serves to ensure, inter alia, continued availability of a connection in the event of a failure.

The system SYS further includes three nodes K1, K2, K3 for optically transmitting further information, particularly information which is destined exclusively for one or two of the four optical network units ONU1, ONU2, ONU3, ONU4.

The further information of the node K1 is destined for the optical network units ONU1 and ONU2. It is transmitted to these units via an additional optical transmission line and an optical coupler C1 which is inserted in the optical transmission line connected via an optical splitter to the optical network units ONU1 and ONU2.

The further information of the node K2 is destined for the optical network units ONU2 and ONU3. It is fed via an additional optical transmission line and an optical coupler C2 into the transmission line which is connected via an optical splitter to the optical network units ONU2 and ONU3. In this manner, the further information of the node K2 reaches both the optical network unit ONU2 and the optical network unit ONU3. The further information of the node K1 and the further information of the node K2 which is destined for the optical network unit ONU2 may be identical, which provides redundancy and ensures continued availability of a connection in the event of a failure of a connection, or different, which results in increased transmission capacity, for example twice the transmission capacity when compared with the optical network units ONU1 and ONU2. The division of the available transmission channels among the optical network units ONU1, ONU2, and ONU3 may also be dynamic, so that a division adapted to the traffic volume can be effected during operation. If the transmission capacity of node K1 is 10 Mb/s, for example, then 6 Mb/s, for example, can be used for the optical network unit ONU1, and 4 Mb/s for the optical network unit ONU2. If the transmission capacity of node K2 is also 10 Mb/s, for example, then 6 Mb/s, for example, can be used for the optical network unit ONU3, and 4 Mb/s for the optical network unit ONU2, so that a total of 8 Mb/s is available for the optical network unit ONU2. If the traffic volume changes, then 5 Mb/s, for example, can be used for the optical network unit ONU1 via node K1, and 5 Mb/s for the optical network unit ONU2, and 5 Mb/s, for example, can be used for the optical network unit ONU3 via node K2, and 5 Mb/s for the optical network unit ONU2, so that a total of 10 Mb/s is available for the optical network unit ONU2.

The further information of node K3 is destined exclusively for optical network unit ONU4. It is fed via an additional optical transmission line and an optical coupler C3 into the transmission line which is connected directly to optical network unit ONU4.

Figure 3:
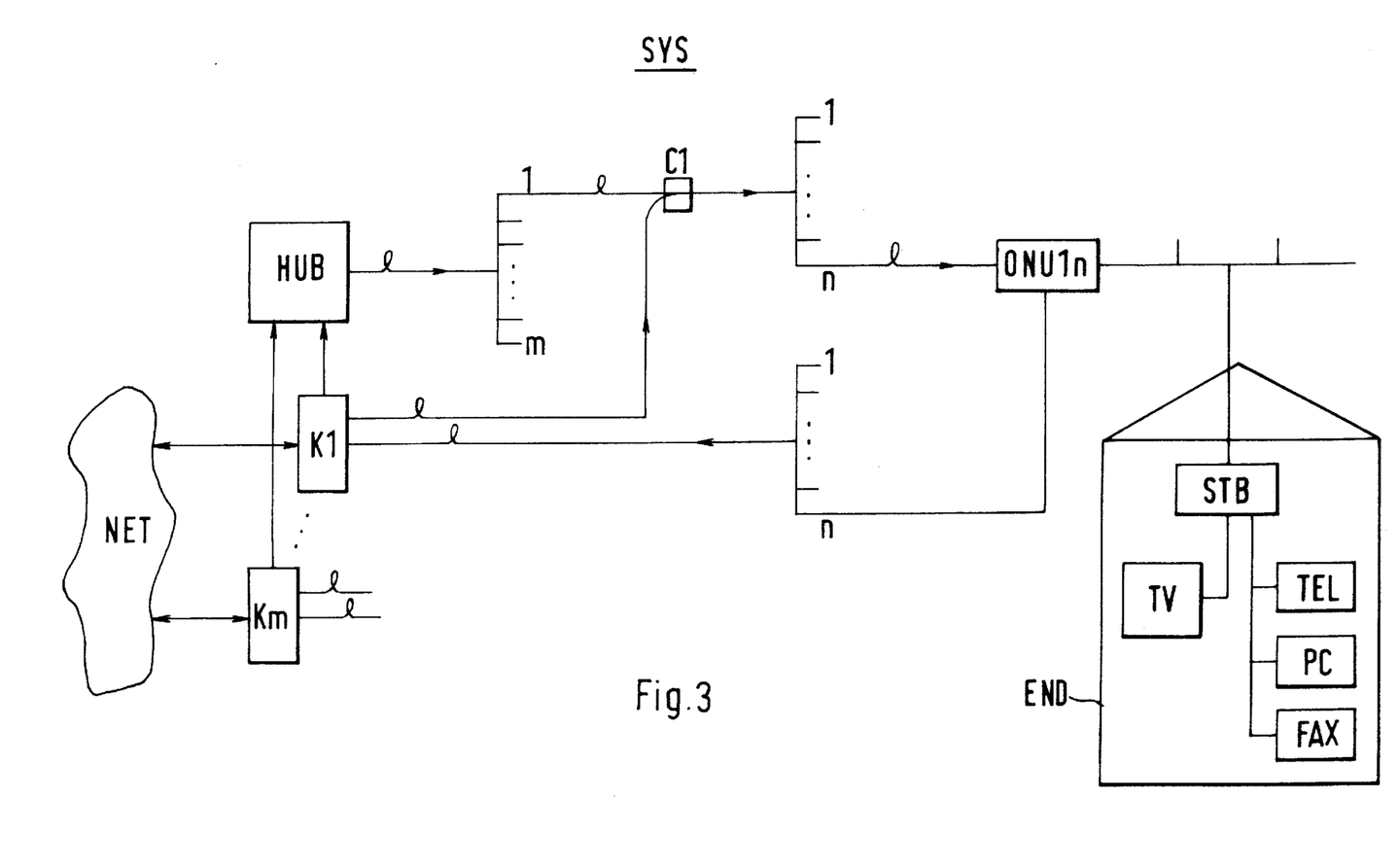
FIG. 3 is a schematic representation of a third optical transmission system according to the invention.

A third embodiment of the invention will now be explained with the aid of FIGS. 3 and 4. FIG. 3 shows an optical transmission system SYS in accordance with the invention. The system SYS is a hybrid fiber/coax access system, for example, which serves to transmit analog and/or digital television and video signals from a subcenter HUB to a plurality of customer locations END as well as interactive request signals from the plurality of customer locations END to the subcenter HUB. Of the customer locations END, one is shown by way of example. The system SYS further serves to transmit data and/or telephone signals from a plurality of nodes K1, . . . , Km to groups of customer locations END as well as telephone and/or data signals from groups of customer locations END to the nodes K1, . . . , Km.

The signals to be transmitted from the subcenter HUB, e.g., a cable television head end, are converted from electrical to optical form at the subcenter and transmitted over a passive optical distribution network consisting of optical transmission lines, such as glass fiber cables, and optical splitters to a plurality of optical network units ONU1$n$, of which one is shown. In each optical network unit ONU1$n$, the received signals are converted from optical to electrical form, and the electrical signals are then transmitted over coaxial cable to a group of customer locations END. The video signals are, for example, movies, educational programs or the like which are selected by customers in an interactive mode.

The customer location END has its own in-house network, to which the customer has access and can connect various terminals. The terminals are, for example, a computer PC, attached via a modem, and a television set TV, a telephone TEL, and a fax machine FAX, which are attached via a set-top box STB.

The passive optical distribution network includes one 1:m optical splitter and m 1:n optical splitters, for example, where m and n are natural numbers, e.g., m=10, n=10. Thus, 100 optical network units ONU1$n$ are connectable to the subcenter HUB.

Each of the nodes K1, . . . , Km is connected to the associated optical network units ONU1$n$ in two ways. Node K1, for example, is connected to the n optical network units ONU1$n$ via an additional optical transmission line and an optical coupler C1 inserted in the first transmission line after the 1:m splitter, and the optical network units ONU1$n$ are connected to this first optical transmission line via a 1:n splitter. The further information of node K1, e.g., television signals, thus reaches n optical network units ONU1$n$. Connected to each optical network unit ONU1$n$ is a group of customer locations END. Each group consists of 20 customer locations END, for example, so that 200 customer locations are connected to node K1. Node K1 establishes telephone or video-telephone connections, for example, to these customer locations END. The transmission of information from the customer locations END to the node K1 takes place via an additional passive optical distribution network, for example a network with an n:1 optical combiner as shown in FIG. 3, or via n separate transmission lines which each connect one optical network unit ONU1n directly to the node K1. Depending on the transmission capacity available in the backstream frequency band and on the number of customer locations END, the additional passive optical distribution network may also be in a mixed form consisting of a plurality of optical combiners and a plurality of direct connections. The method used to access the customer locations END is CMDA (code division multiple access). Nodes K2 to Km are connected to the associated optical network units and the groups of customer locations END in a manner similar to node K1. The transmission of information takes place correspondingly.

Each of the nodes K1, ..., Km is connected to the subcenter HUB by an optical or electric transmission line. They include means for separating the information received from the optical network units ONU1n connected to them and means for routing part of the information received from the optical network units ONU to the subcenter HUB. The information from the optical network units ONU1n contains interactive request signals and telephone signals, for example. The first means separates the request signals and the telephone signals; this can be done, for example, with electrical bandpass filters following an optical-to-electrical conversion. The second means, e.g., an electrical-to-optical transducer, passes the request signals on to the subcenter.

The nodes K1, ..., Km are connected, for example, to a telephone network NET, such as an integrated services digital network (ISDN). Via each node K1, ..., Km, telephone signals are transmitted from the ISDN to the group of customer locations END and from at least one group of customer locations END into the ISDN.

Figure 4:
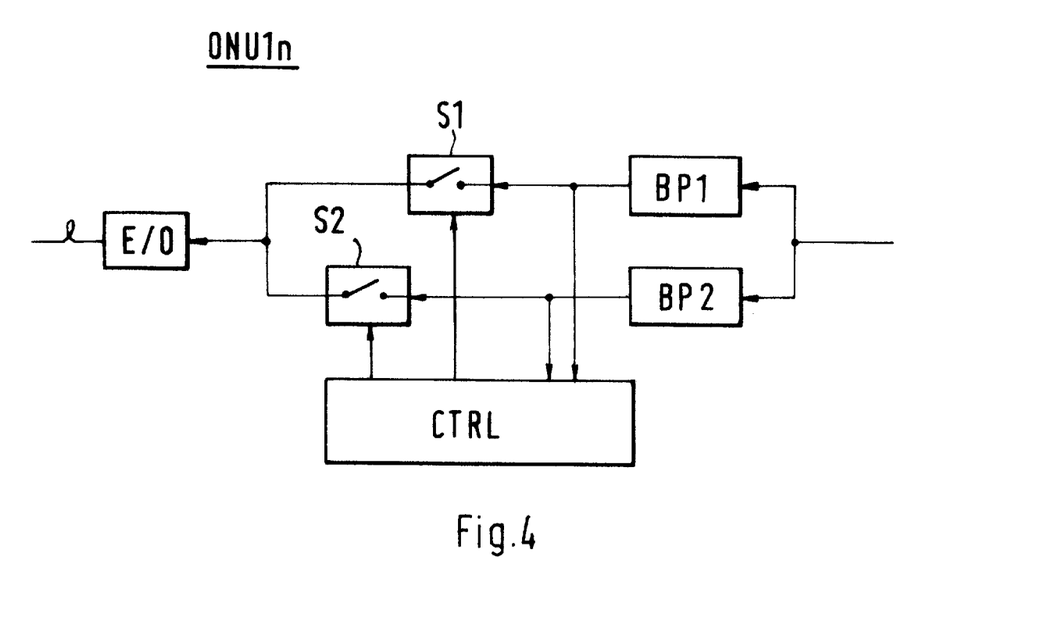
FIG. 4 is a schematic block diagram of a portion of the optical network unit of FIG. 3.

FIG. 4 shows a portion of the optical network unit ONU1n of FIG. 3, namely a link which is used for transmitting information from the customer locations to the nodes. The link serves to suppress interference and contains two switches S1, S2, two bandpass filters BP1, BP2, a control unit CTRL, and an electrical-to-optical transducer E/O. The two switches S1, S2 serve to block or unblock at least part of the frequency band used to transmit information to the respective node K1, ..., Km. If no transmission is to take place in this part of the frequency band, this part will be blocked.

The two bandpass filters BP1, BP2, which can be replaced by diplexers or bandstop filters, serve to separate the frequency band used to transmit information to the respective node K1, ..., Km. The bandpass filter BP1 blocks all frequencies except those for the interactive signals, for example. The bandpass filter BP2 blocks all frequencies except those for the telephone signals, for example.

The control unit CTRL serves to detect the signal levels in the separated frequency bands and to control the two switches S1, S2. To accomplish this, the control unit CTRL includes an amplitude detector, for example, which detects the amplitudes of the interactive request signals and the telephone signals and compares them with an upper and a lower threshold. The upper threshold is a maximum value which must not be exceeded because otherwise errors will be caused on the transmission line. The lower threshold is a minimum value below which the amplitudes must not fall, since as a result of the attenuation on the transmission line, the signal is no longer detectable in the node. The two switches S1 and S2 are controlled in such a way that, if the respective signal level is below a preset minimum threshold or above a preset upper threshold, the respective frequency band will be blocked. In the electrical-to-optical transducer E/O, which is implemented with a directly modulated laser diode, for example, all signals in the frequency bands unblocked by the switches S1 and S2 are converted from electrical to optical form and subsequently transmitted to the associated node.

In the three embodiments, information is combined via optical couplers and transmitted over an optical transmission line. The information transmitted by the subcenter HUB and the further information transmitted by the plurality of nodes K1, ..., Km can be transmitted at different wavelengths. This has the advantage that the possibility of interferences occurring during the combination of the information is reduced. In addition, a greater frequency range is thus available both for the subcenter HUB and for each individual node K1, ..., Km, so that a greater number of transmission channels is possible.

Figure 5:
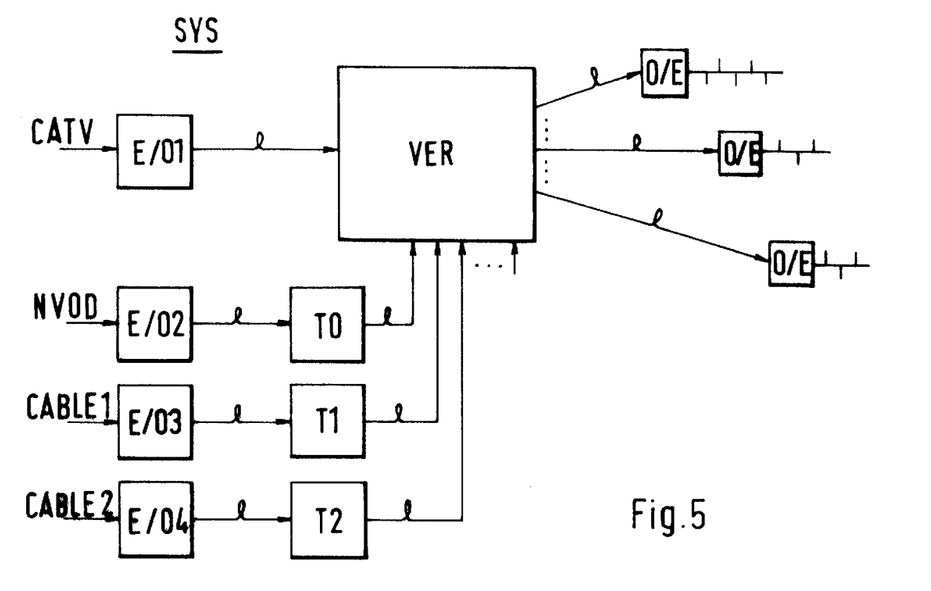
FIG. 5 is a schematic representation of a fourth optical transmission system according to the invention.

A fourth embodiment of the invention will now be explained with the aid of FIGS. 5 and 6. FIG. 5 shows an optical transmission system SYS. The system SYS includes four electrical-to-optical transducers E/O1, E/O2, E/O3, E/O4 for converting and transmitting four different types of information. The electrical-to-optical transducer E/O1 serves to convert electric television signals CATV to optical signals of wavelength $\lambda_1$ and to transmit these signals over an optical transmission line to a broadband signal distribution unit VER. In the signal distribution unit VER, the television signals are split into a plurality of optical signals which are then transmitted over a plurality of optical transmission lines to a plurality of optical-to-electrical transducers O/E which convert the optical signals back to electric television signals that can be transmitted to a plurality of customer locations over, e.g., coaxial cable. The system SYS is thus, among other things, a distribution system for cable television signals CATV.

The electrical-to-optical transducer E/O2 serves to convert and transmit near-video-on-demand signals NVOD. These are video signals which are transmitted repeatedly at predetermined time intervals and which the subscriber can access by paying a fee. To avoid optical interferences, they can be transmitted at the wavelength $\lambda_2 \neq \lambda_1$. The optical near-video-on-demand signals NVOD are applied over an optical transmission line to an optical attenuator T0. This optical attenuator TO serves to adapt the amplitude of the optical near-video-on-demand signals NVOD so that the already existing television signals CATV will be affected as little as possible. The optical output signal of the attenuator T0 is fed over a further optical transmission line to the optical signal distribution unit VER. In the optical signal distribution unit VER, the optical near-video-on-demand signals NVOD are combined with the optical television signals CATV in order to be transmitted over single optical transmission lines to the plurality of customer locations. The optical signal distribution unit VER is operated in a wavelength-division-multiplex mode, for example.

The electrical-to-optical transducer E/O3 serves to convert and transmit cablephone signals CABLE1. Optical cablephone signals are telephone signals which are transmitted over optical transmission lines. The optical cablephone signals CABLE1 are transmitted, for example at the wavelength $\lambda_3 \neq \lambda_2 \neq \lambda_1$, over an optical transmission line to an optical attenuator T1 which adapts the signal levels in a manner similar as the optical attenuator T0. Then the optical cablephone signals CABLE1 are transmitted over a further optical transmission line to the optical signal distribution unit VER. The cablephone signals CABLE1 are to be transmitted to only part of the customer locations. Therefore, provision is made in the optical signal distribution unit VER to combine the cablephone signals CABLE1 with the optical television signals CATV and the optical near-video-on-demand signals NVOD in such a way that they are applied to only part of the optical transmission lines at the output of the optical signal distribution unit VER. This will be considered in greater detail below. FIG. 5 shows only the forward channel for the optical cablephone signals. An implementation for the reverse channel is illustrated in FIG. 3, for example.

The electrical-to-optical transducer E/O4 serves to convert and transmit cablephone signals CABLE2. The optical cablephone signals CABLE2 are transmitted at the wavelength $\lambda_3 \neq \lambda_2 \neq \lambda_1$, for example. They are transmitted to that part of the customer locations which does not already have access to a telephone network through the cablephone signals CABLE1. The optical cablephone signals CABLE2 are transmitted via an optical transmission line, an optical attenuator T2, which serves to adapt the signal levels in a similar manner as the optical attenuator T0 explained above, and a further optical transmission line to the optical signal distribution unit VER. In the optical signal distribution unit VER, the optical cablephone signals CABLE2 are combined with the optical television signals CATV and the optical near-video-on-demand signals NVOD in such a way that they reach all those optical-to-electrical transducers O/E which are not reached by the optical cablephone signals CABLE1.

The optical signal distribution unit VER may be fed with further optical signals, which will not be discussed here. Instead of the near-video-on-demand signals NVOD and the cablephone signals CABLE1 and CABLE2, other information, such as video-on-demand signals, may be transmitted, thus making available other services. In the case of video-on-demand signals, a separate broadband transmission channel must be provided for each customer location. The use of the optical attenuators T0, T1, T2 is optional and depends on the optical output power of the electrical-to-optical transducers and on the distribution depth of the respective services. In the system SYS of FIG. 5, particularly unidirectional distribution signals (CATV) are combined with bidirectional signals (CABLE1, CABLE2).

Figure 6:
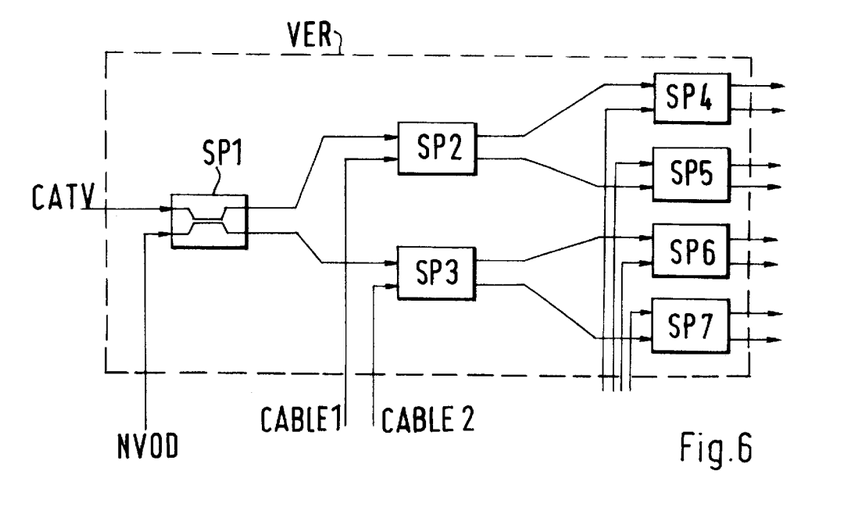
FIG. 6 is a schematic block diagram of one embodiment of the optical signal distribution unit according to the invention in the system of FIG. 5.

FIG. 6 shows one embodiment of the optical signal distribution unit VER of the system of FIG. 5. The optical signal distribution unit VER contains seven broadband optical splitters SP1, SP2, SP3, SP4, SP5, SP6, SP7. Each of the seven optical splitters SP1 to SP7 has two input ports and two output ports. It serves to combine two different signals and route the combined signals simultaneously to both output ports. Such optical splitters, which are also referred to as optical couplers, particularly as 2×2 couplers, are known, for example, from ELECTRONICS LETTERS, Aug. 15, 1985, Vol. 21, No. 17, pages 742–743. At the optical splitter SP1, the optical television signals CATV are applied at one input port, and the optical near-video-on-demand signals NVOD at the other. These signals are combined in the optical splitter SP1. The optical television signals CATV and the optical near-video-on-demand signals NVOD are transmitted at the wavelengths $\lambda_1 = 1520$ nm and $\lambda_2 = 1300$ nm, for example. The electric television signals lie in the 100–400 MHz band, and the electric near-video-on-demand signals in the 410–800 MHz band, for example.

In the optical splitter SP1, the combined optical television signals CATV and optical near-video-on-demand signals NVOD are split into two signals, which are coupled to the two output ports of the splitter. The two splitter output signals have the same signal level and contain both the optical television signals CATV and the optical near-video-on-demand signals NVOD. The optical splitter SP1 is followed by the optical splitters SP2 and SP3.

One input port of the optical splitter SP2 is fed with the optical signals from one output port of the optical splitter SP1. One input port of the optical splitter SP3 is fed with the optical signals from the other output port of the optical splitter SP1. The other input port of the optical splitter SP2 receives the optical cablephone signals CABLE1. The other input port of the optical splitter SP3 receives the optical cablephone signals CABLE2.

In the optical splitter SP2, the already combined optical television signals CATV and optical near-video-on-demand signals NVOD are thus additionally combined with optical cablephone signals CABLE1. Each output port of the optical splitter SP2 thus provides signals containing a combination of optical television signals CATV, optical near-video-on-demand signals NVOD, and optical cablephone signals CABLE1.

In the optical splitter SP3, the already combined optical television signals CATV and optical near-video-on-demand signals NVOD are additionally combined with the optical cablephone signals CABLE2. Each output port of the optical splitter SP3 thus provides signals containing a combination of optical television signals CATV, optical near-video-on-demand signals NVOD, and optical cablephone signals CABLE2.

The optical splitter SP2 is followed by the optical splitters SP4 and SP5.

One input port of the optical splitter SP4 is fed with the optical signals from one output port of the optical splitter SP2. One input port of the optical splitter SP5 is fed with the optical signals from the other output port of the optical splitter SP2. The other input port of the optical splitter SP4 and the other input port of the optical splitter SP5 are not used here. Instead of having two input ports and two output ports, the optical splitters SP4 and SP5 of this embodiment may have one input port and at least two output ports.

The optical splitters SP4 and SP5 serve to distribute the optical television signals CATV, the optical near-video-on-demand signals NVOD, and the optical cablephone signals CABLE1 to several optical-to-electrical transducers O/E.

The optical splitter SP3 is followed by the optical splitters SP6 and SP7.

For the design and operation of the optical splitters SP6 and SP7, the same remarks as those made above about the optical splitters SP4 and SP5 apply, with the difference that the optical cablephone signals CABLE1 must be replaced by the optical cablephone signals CABLE2.

In this embodiment of the system SYS, the optical television signals CATV and the optical near-video-on-demand signals NVOD reach all customer locations, while the optical cablephone signals CABLE1 and CABLE2 each reach only part of the customer locations. However, any assignment of the additional services to the inputs of the signal distribution unit VER which do not receive CATV signals is possible. This example was chosen because more channels are needed for telephony than for near-video-on-demand:

In a basic access configuration for each customer location with two 64-kb/s bearer channels, one 16-kb/s signaling channel, and one 16-kb/s control channel as is used in the ISDN, a transmission capacity of 160 Mb/s is needed for 1000 customer locations. The optical cablephone signals CABLE1 and CABLE2 each provide one 160-kb/s channel for 1000 customer locations, so that a total of 2000 channels, and thus a transmission capacity of 320 Mb/s, are needed for 2000 customer locations.

For the transmission of video signals of a video film, for example, 8 Mb/s are needed. At the feed-in point for the near-video-on-demand signals at the optical splitter SP1, in comparison with the optical cablephone signals CABLE1 and CABLE2, double the transmission capacity, i.e., 320 Mb/s, is available, for example. Accordingly, 40 near-video-on-demand signals can be transmitted over 40 channels to the total of 2000 customer locations.

Figure 7:
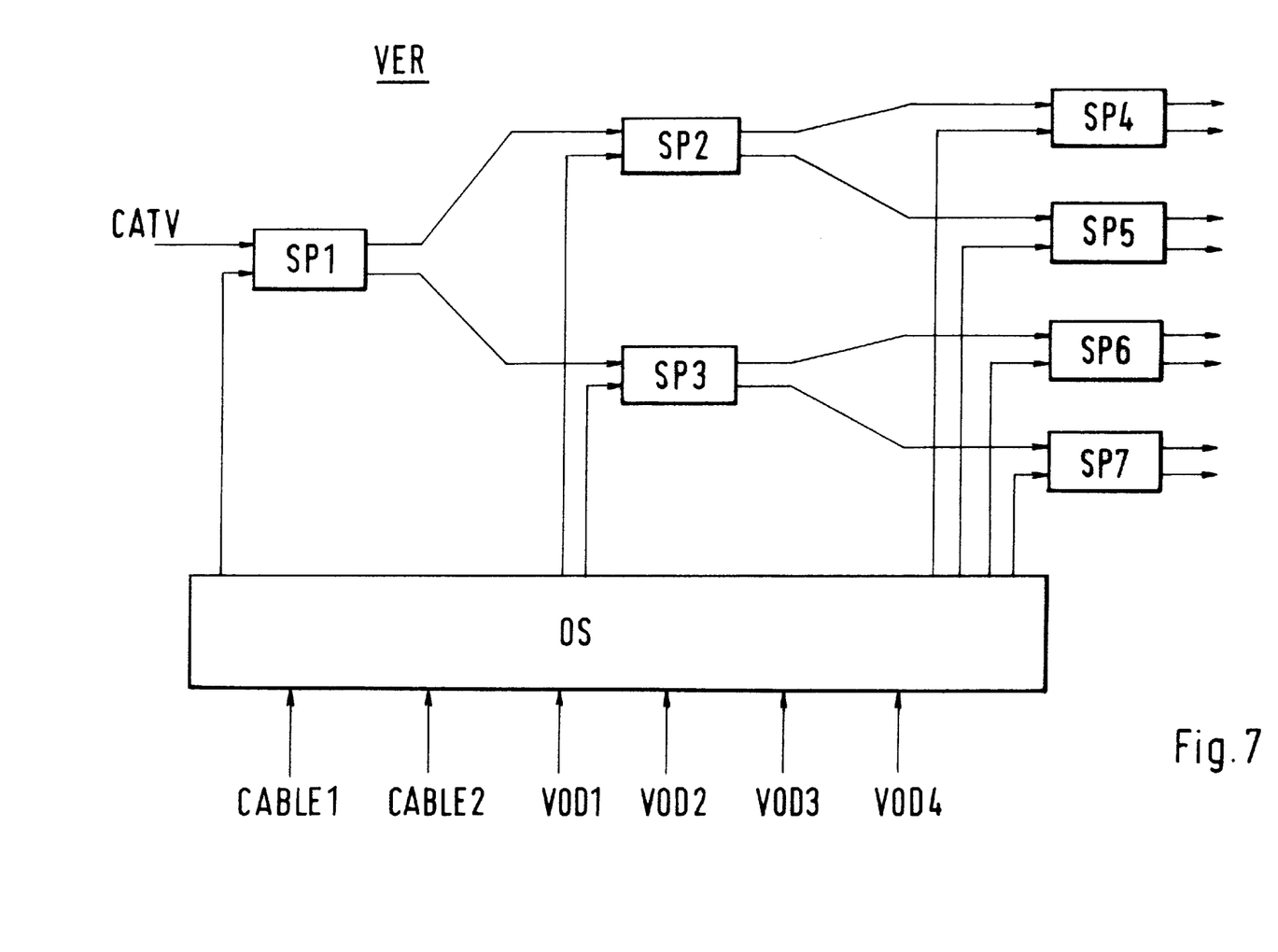
FIG. 7 is a schematic block diagram of another embodiment of the optical signal distribution unit according to the invention in the system of FIG. 5.

FIG. 7 shows another embodiment of the optical signal distribution unit VER of the system of FIG. 5. The optical signal distribution unit VER comprises seven optical splitters SP1 to SP7 whose design and configuration correspond to those of the optical splitters of the signal distribution unit of FIG. 6. The optical signal distribution unit VER further includes an optical switching unit OS which is designed to selectively switch different input signals, such as optical cablephone signals CABLE1 or CABLE2 and optical video-on-demand signals VOD1, VOD2, VOD3, or VOD4, to different input ports of the optical splitters SP1 to SP7.

To do this, the optical switching unit OS contains, for example, several optical switches and, if necessary, several optical combiners whose configuration depends on the desired flexibility of the switching capability of the optical switching unit OS. The optical combiners serve, for example, to combine two signals in advance and apply the combined signals to one of the input ports of the optical splitters SP1 to SP7. The switches are remotely controlled from a center over a separate control line, for example.

EXAMPLE 1

The cablephone signals CABLE1 are switched to the optical splitter SP1 and are thus available to all customer locations. The video-on-demand signals VOD1 are switched to the optical splitter SP2 and are thus available to only part of the customer locations, namely to that part which is connected to the optical aplitters SP4 and SP5. The video-on-demand signals VOD2 are switched to the optical splitter SP3 and are thus available to only a part of the customer locations, namely to that which is connected to the optical splitters SP6 and SP7.

EXAMPLE 2

The cablephone signals CABLE1 are switched to the optical splitter SP2, and the cablephone signals CABLE2 to the optical splitter SP3. This becomes necessary, for example, if the network is extended by attaching further customer locations, for which increased transmission capacity is needed. The video-on-demand signals VOD1 will then be switched, for example, to the optical splitter SP4, the video-on-demand signals VOD2 to the optical splitter SP5, the video-on-demand signals VOD3 to the optical splitter SP6, and the video-on-demand signals VOD4 to the optical splitter SP7.

EXAMPLE 3

The cablephone signals CABLE1 are switched to the optical splitter SP1 and are thus available to all customer locations. The video-on-demand signals VOD1 are switched to the optical splitter SP2 and are thus available to only part of the customer locations, namely to that part which is connected to the optical splitters SP4 and SP5. The video-on-demand signals VOD2 are switched to the optical splitter SP6, and the video-on-demand signals VOD3 to the optical splitter SP7. This is advisable, for example, to save transmission capacity if the customer locations connected to the optical splitters SP4 and SP5 on an average require the same transmission capacity as the customer locations connected to the optical splitter SP6, which on an average require a transmission capacity comparable to that of the customer locations connected to the optical splitter SP7, for example. In this manner, cablephone signals and video-on-demand signals can be assigned to customer locations according to demand.

Figure 8:
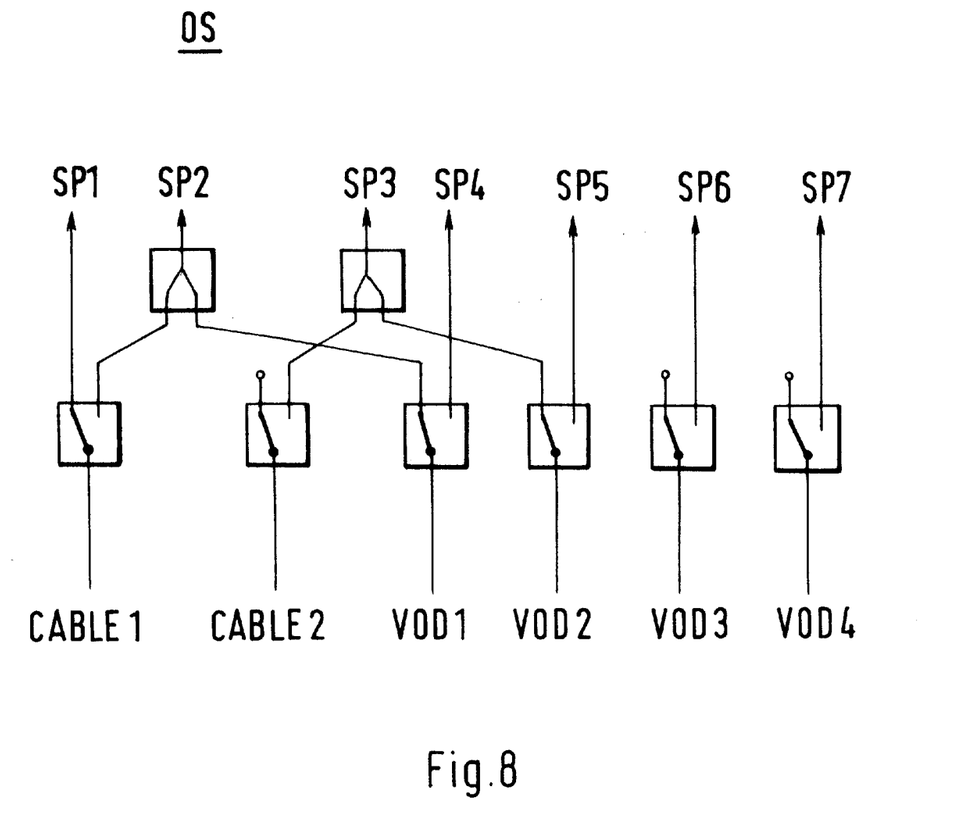
FIG. 8 shows one embodiment of the optical switching unit of the optical signal distribution unit of FIG. 7.

FIG. 8 shows one embodiment of the optical switching unit OS of the optical signal distribution unit of FIG. 7. The optical switching unit OS contains six optical switches and two optical combiners. With these components, all three examples described in connection with FIG. 7 can be implemented. In FIG. 8, Example 1 is implemented by each switch providing a connection to the respective left-hand output. Another example would be to switch the optical cablephone signals CABLE1 and the video-on-demand signals VOD1 to the optical splitter SP2, and the optical cablephone signals CABLE2 and the video-on-demand signals VOD2 to the optical splitter SP3.

Furthermore, combinations of the embodiments are possible as well as extensions, such as additions of further optical splitters to obtain an 1:16 or 1:32 splitter. Minimum configurations with only three optical splitters or a minimum version in the form of only one optical splitter can also be used.

What is claimed is:

1. A system (SYS) for optically transmitting information from a subcenter (HUB) over a plurality of optical transmission lines to a plurality of optical network units (ONU), the system (SYS) comprising at least one means (K1, . . . , Km) for optically transmitting further information and at least one optical coupler (C1, C2, SP1, SP2, SP3, SP4, SP5, SP6, SP7), the further information of each of the means (K1, . . . , Km) being fed via a respective one of the optical couplers (C1, C2, SP1, SP2, SP3, SP4, SP5, SP6, SP7) into an optical transmission line connected to only part of the plurality of optical network units (ONU), characterized in that an optical signal distribution unit (VER) is provided for combining the information (CATV) and the further information (CABLE, NVOD, VOD) and then transmitting it together to the respective part of the plurality of optical network units (ONU), that the optical signal distribution unit (VER) comprises at least three optical couplers (SP1, SP2, SP3), at least two (SP2, SP3) of which have two input ports and two output ports, that the information (CATV) is applied to one (SP1) of the at least three optical couplers (SP1, SP2, SP3) which is connected to two of the at least two optical couplers (SP2, SP3) with two input ports, and that the further information (CABLE, VOD) is applied to at least one of the at least two optical couplers (SP2, SP3) with two input ports in order to combine it with the information (CATV) from the subcenter (HUB).

2. A system (SYS) as claimed in claim 1, characterized in that an optical switching unit (OS) is provided for controlling the assignment of the further information (CABLE, NVOD, VOD) to the at least one input of one of the at least three optical couplers (SP1, SP2, SP3).

3. A system (SYS) as claimed in claim 2, characterized in that the subcenter (HUB) and the at least one means (K1, . . . , Km) each comprise an electrical-to-optical transducer (E/O) for converting electric signals to optical signals, with the optical signals having the same wavelength, and with the frequency ranges of the electric signals in the subcenter (HUB) and in the at least one means (K1, . . . , Km) chosen so as not to overlap.

4. A system (SYS) as claimed in claim 2, characterized in that the plurality of optical network units (ONU) are connected to the at least one means (K1, . . . , Km) by further optical transmission lines.

5. A system (SYS) as claimed in claim 4, characterized in that the at least one means (K1, . . . , Km) is connected to the subcenter (HUB) and comprises means for separating the information received from the plurality of optical network units (ONU) and means for routing part of the information received from the optical network units (ONU) to the subcenter (HUB).

6. A system (SYS) as claimed in claim 1, characterized in that the subcenter (HUB) and the at least one means (K1, . . . , Km) each comprise an electrical-to-optical transducer (E/O) for converting electric signals to optical signals, with the optical signals having the same wavelength, and with the frequency ranges of the electric signals in the subcenter (HUB) and in the at least one means (K1, . . . , Km) chosen so as not to overlap.

7. A system (SYS) as claimed in claim 6, characterized in that the plurality of optical network units (ONU) are connected to the at least one means (K1, . . . , Km) by further optical transmission lines.

8. A system (SYS) as claimed in claim 7, characterized in that the at least one means (K1, . . . , Km) is connected to the subcenter (HUB) and comprises means for separating the information received from the plurality of optical network units (ONU) and means for routing part of the information received from the optical network units (ONU) to the subcenter (HUB).

9. A system (SYS) as claimed in claim 1, characterized in that the plurality of optical network units (ONU) are connected to the at least one means (K1, . . . , Km) by further optical transmission lines.

10. A system (SYS) as claimed in claim 9, characterized in that the at least one means (K1, . . . , Km) is connected to the subcenter (HUB) and comprises means for separating the information received from the plurality of optical network units (ONU) and means for routing part of the information received from the optical network units (ONU) to the subcenter (HUB).

11. A system (SYS) as claimed in claim 10, characterized in that the information to be transmitted by the plurality of optical network units (ONU) includes interactive request signals and telephone signals, and that the interactive request signals and the telephone signals are transmitted to the subcenter (HUB) and the telephone network (NET), respectively.

12. A system (SYS) as claimed in claim 1, characterized in that the subcenter (HUB) is a cable television head end, that the information includes television signals, and that the cable television head end is connected to the plurality of optical network units (ONU) by an optical distribution network with at least one optical splitter.

13. A system (SYS) as claimed in claim 12, characterized in that the further information includes telephone signals, that the at least one means (K1, . . . , Km) is connectable to a telephone network (NET), that each of the plurality of optical network units (ONU) is connectable to a respective group of customer locations (END), and that through each of the means (K1, . . . , Km), telephone signals are transmitted to at least one group of customer locations (END).

14. A system (SYS) as claimed in claim 13, characterized in that in order to suppress interference, each of the plurality of optical network units (ONU) comprises at least one switch (S1, S2) by means of which at least a subdivision of the frequency band used to transmit information to the respective node (K1, . . . , Km) is blocked if no transmission is to take place in said subdivision of the frequency band.

15. A system (SYS) as claimed in claim 14, characterized in that each of the plurality of optical network units (ONU) comprises at least two means (BP1, BP2) for separating the frequency band used to transmit information to the respective node (K1, . . . , Km) and a control unit (CTRL) for detecting the signal levels in the separated frequency bands and for controlling the at least one switch (S1, S2), and that the at least one switch (S1, S2) is controlled in such a way that, if the respective signal level is below a preset lower threshold or above a preset upper threshold, the respective frequency band will be blocked.

16. A system (SYS) as claimed in claim 13, characterized in that the information to be transmitted by the plurality of optical network units (ONU) includes interactive request signals and telephone signals, and that the interactive request signals and the telephone signals are transmitted to the subcenter (HUB) and the telephone network (NET), respectively.

17. A system (SYS) as claimed in claim 16, characterized in that in order to suppress interference, each of the plurality of optical network units (ONU) comprises at least one switch (S1, S2) by means of which at least a subdivision of the frequency band used to transmit information to the respective node (K1, . . . , Km) is blocked if no transmission is to take place in said subdivision of the frequency band.

18. A system (SYS) as claimed in claim 17, characterized in that each of the plurality of optical network units (ONU) comprises at least two means (BP1, BP2) for separating the frequency band used to transmit information to the respective node (K1, . . . , Km) and a control unit (CTRL) for detecting the signal levels in the separated frequency bands and for controlling the at least one switch (S1, S2), and that the at least one switch (S1, S2) is controlled in such a way that, if the respective signal level is below a preset lower threshold or above a preset upper threshold, the respective frequency band will be blocked.

19. A system (SYS) as claimed in claim 1, characterized in that the information transmitted by the subcenter (HUB) and the further information transmitted by the at least one means (K1, . . . , Km) are transmitted at different wavelengths.

20. An optical signal distribution unit (VER) for an optical transmission system (SYS) for transmitting at least three different types of information (CATV, CABLE1, CABLE2), comprising at least three optical couplers (SP1, SP2, SP3), at least two (SP2, SP3) of which have two input ports and two output ports, that a first type of information (CATV) is applied to one (SP1) of the at least three optical couplers (SP1, SP2, SP3) which is connected to two of the at least two optical couplers (SP2, SP3) with two input ports, that a second type of information (CABLE, NVOD, VOD) is applied to at least one (SP2) of the at least two optical couplers (SP2, SP3) with two input ports to combine it with the first type of information (CATV), and that a third type of information (CABLE, NVOD, VOD) is applied to at least one (SP3) of the at least two optical couplers (SP2, SP3) with two input ports to combine it with the first type of information (CATV).

\* \* \* \* \*